(12) United States Patent
Groff et al.

(10) Patent No.: US 7,898,106 B2
(45) Date of Patent: Mar. 1, 2011

(54) DC UPS CONFIGURED AS INTRINSIC POWER TRANSFER SWITCH

(75) Inventors: Steven Mark Groff, Tucson, AZ (US); Trung Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 12/174,388

(22) Filed: Jul. 16, 2008

(65) Prior Publication Data

US 2010/0013313 A1 Jan. 21, 2010

(51) Int. Cl.
*H02J 1/10* (2006.01)
(52) U.S. Cl. .............................. 307/18; 307/65
(58) Field of Classification Search .............. 307/18, 307/19, 66, 67, 23, 64, 65
See application file for complete search history.

(56) References Cited

U.S. PATENT DOCUMENTS

| | | | | |
|---|---|---|---|---|
| 5,483,108 A | * | 1/1996 | Girard et al. ................. | 307/64 |
| 5,721,481 A | * | 2/1998 | Narita et al. ................. | 320/111 |
| 5,920,129 A | | 7/1999 | Smith | |
| 6,122,181 A | * | 9/2000 | Oughton, Jr. ................. | 363/37 |
| 6,166,531 A | | 12/2000 | Hogan et al. | |
| 6,181,029 B1 | | 1/2001 | Berglund et al. | |
| 6,304,006 B1 | * | 10/2001 | Jungreis ......................... | 307/64 |
| 6,940,187 B2 | | 9/2005 | Escobar et al. | |
| 2003/0227785 A1 | | 12/2003 | Johnson, Jr. | |
| 2005/0157525 A1 | * | 7/2005 | Hanson ......................... | 363/65 |
| 2007/0210652 A1 | | 9/2007 | Tracy et al. | |
| 2008/0231115 A1 | * | 9/2008 | Cho et al. ..................... | 307/41 |
| 2010/0013311 A1 | * | 1/2010 | Groff et al. ................... | 307/66 |
| 2010/0013314 A1 | * | 1/2010 | Groff et al. ................... | 307/66 |

FOREIGN PATENT DOCUMENTS

| JP | 2001028846 A | * | 1/2001 |
|---|---|---|---|
| JP | 2005086969 A | * | 3/2005 |

* cited by examiner

*Primary Examiner* — Jared J Fureman
*Assistant Examiner* — Daniel Cavallari
(74) *Attorney, Agent, or Firm* — Griffiths & Seaton PLLC

(57) ABSTRACT

A direct current (DC) uninterruptible power supply (UPS) configured as an intrinsic power transfer switch is provided. The DC UPS includes first and second inputs. First and second rectifiers are coupled to the first and second inputs. A common node is coupled to the first and second rectifiers. At least one DC output is coupled to the common node. The at least one DC output is adapted for connection to at least one electrical load. The first input is adapted for connection to a first electrical service, and the second input is adapted for connection to a second electrical service. The DC UPS continues to supply power to the at least one electrical load in the event of a loss of either the first or second electrical services.

17 Claims, 4 Drawing Sheets

DC UPS CONFIGURED AS INTRINSIC POWER TRANSFER SWITCH

CROSS-REFERENCE TO RELATED APPLICATIONS

This application is related to U.S. Non-Provisional application Ser. Nos. 12/174,381, 12/174,386, and 12/174,425 filed concurrently herewith and incorporated herein by reference.

BACKGROUND OF THE INVENTION

1. Field of the Invention

The present invention relates in general to power supplies for electronic devices, and more particularly, but not exclusively, to direct current (DC) uninterruptible power supplies (UPS) configured as intrinsic power transfer switches for use in computing environments.

2. Description of the Related Art

A controlled transfer switch is a common method to disconnect an electrical service and connect an alternate service to a computer system. Switching electrical services is often required when one service is lost and an alternate service is still functional.

FIG. 1 illustrates a conventional power transfer switch 11. Power distribution to electrical loads 13 and 15 from electrical services A and B is managed by a variety of sensor and control equipment, including a sensor 17 to monitor electrical service A, and a sensor 19 to monitor electrical service B. Additional hardware 21 evaluates statuses of the electrical services A and B, and provides the status information to control transfer switch hardware 23, which provides the switching functionality.

For the conventional switch as illustrated in FIG. 1, overt control is required to disconnect one electrical service and connection of another. The switching action can fail at the sensor, evaluation function, switch controller or at switch itself. This decreases availability and reliability of power to vital computer systems.

The sequence and timing of the transfer switch is important to the overall functionality of the system. Two different electrical services cannot be directly connected to the electrical load (computer system) at the same time because of unmatched phase and frequency or greatly differing magnitudes. The switch must first disconnect a failed service, and then connect a functioning electrical service. This creates several failure modes. For example, the switch may fail to disconnect before connecting, the switch may fail to connect after disconnection, or the switch may connect before disconnecting.

In addition to the foregoing, in any conventional switching system there is a delay or dead time associated with the transfer of power. This can create short gaps in power availability that the computer system's power supplies must accommodate.

SUMMARY OF THE INVENTION

Multiple independent AC electrical power services are normally available in information technology (IT) centers. The redundant feeds increase availability of power to computer systems. It is not possible to directly combine AC sources of unmatched phase and frequency or greatly differing magnitudes.

A need exists for a mechanism to connect multiple redundant electrical services that have unmatched phase and frequency or greatly differing magnitudes without a transfer switch. Accordingly, in one embodiment, by way of example only, a direct current (DC) uninterruptible power supply (UPS) configured as an intrinsic power transfer switch is provided. The DC UPS includes first and second inputs. First and second rectifiers are coupled to the first and second inputs. A common node is coupled to the first and second rectifiers. At least one DC output is coupled to the common node. The at least one DC output is adapted for connection to at least one electrical load. The first input is adapted for connection to a first electrical service, and the second input is adapted for connection to a second electrical service. The DC UPS continues to supply power to the at least one electrical load in the event of a loss of either the first or second electrical services.

In an additional embodiment, again by way of example only, an intrinsic power transfer switch for a high-power electrical load requiring at least two electrical service inputs is provided. A first direct current (DC) uninterruptible power supply (UPS) has a first output coupled to the electrical load for driving the electrical load. A second DC UPS having a second output is coupled to a first input of the first DC UPS for driving the electrical load through the first DC UPS. The first and second DC UPS continue to supply power to the electrical load in the event of a loss of either a first or second electrical service.

In still another embodiment, again by way of example only, a method of manufacturing a direct current (DC) uninterruptible power supply (UPS) configured as an intrinsic power transfer switch is provided. First and second inputs are provided. First and second rectifiers coupled to the first and second inputs are provided. A common node coupled to the first and second rectifiers is provided. At least one DC output coupled to the common node is provided. The at least one DC output is adapted for connection to at least one electrical load. The first input is adapted for connection to a first electrical service, and the second input is adapted for connection to a second electrical service. The DC UPS continues to supply power to the at least one electrical load in the event of a loss of either the first or second electrical services.

In still another embodiment, again by way of example only, a method of manufacturing an intrinsic power transfer switch for a high-power electrical load requiring at least two electrical service inputs is provided. A first direct current (DC) uninterruptible power supply (UPS) having a first output coupled to the electrical load for driving the electrical load is provided. A second DC UPS having a second output coupled to a first input of the first DC UPS for driving the electrical load through the first DC UPS is provided. The first and second DC UPS continue to supply power to the electrical load in the event of a loss of either a first or second electrical service.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for configuring one or more uninterruptible power supplies (UPS) as an intrinsic power transfer switch. In one embodiment, a single UPS device may be used. In other embodiments, a series of interconnected UPS devices may be used. Where a series of interconnected UPS devices are implemented, such configurations allow for automatic transfer of power between electrical services even if the services are of unmatched phase and frequency, or of greatly differing magnitudes.

The illustrated embodiments require no overt action to route the power from the functioning service to the electrical load(s). No overt action is required to disconnect power from a lost or non-functioning service. No sensor, evaluation function, switch controller, hardware switch, or additional hardware is required. In addition, no critical switching sequence is needed. Finally, the illustrated embodiments allow for power transfer switching functionality without transfer delays or power disruptions during transfer as described above.

Figure 1:
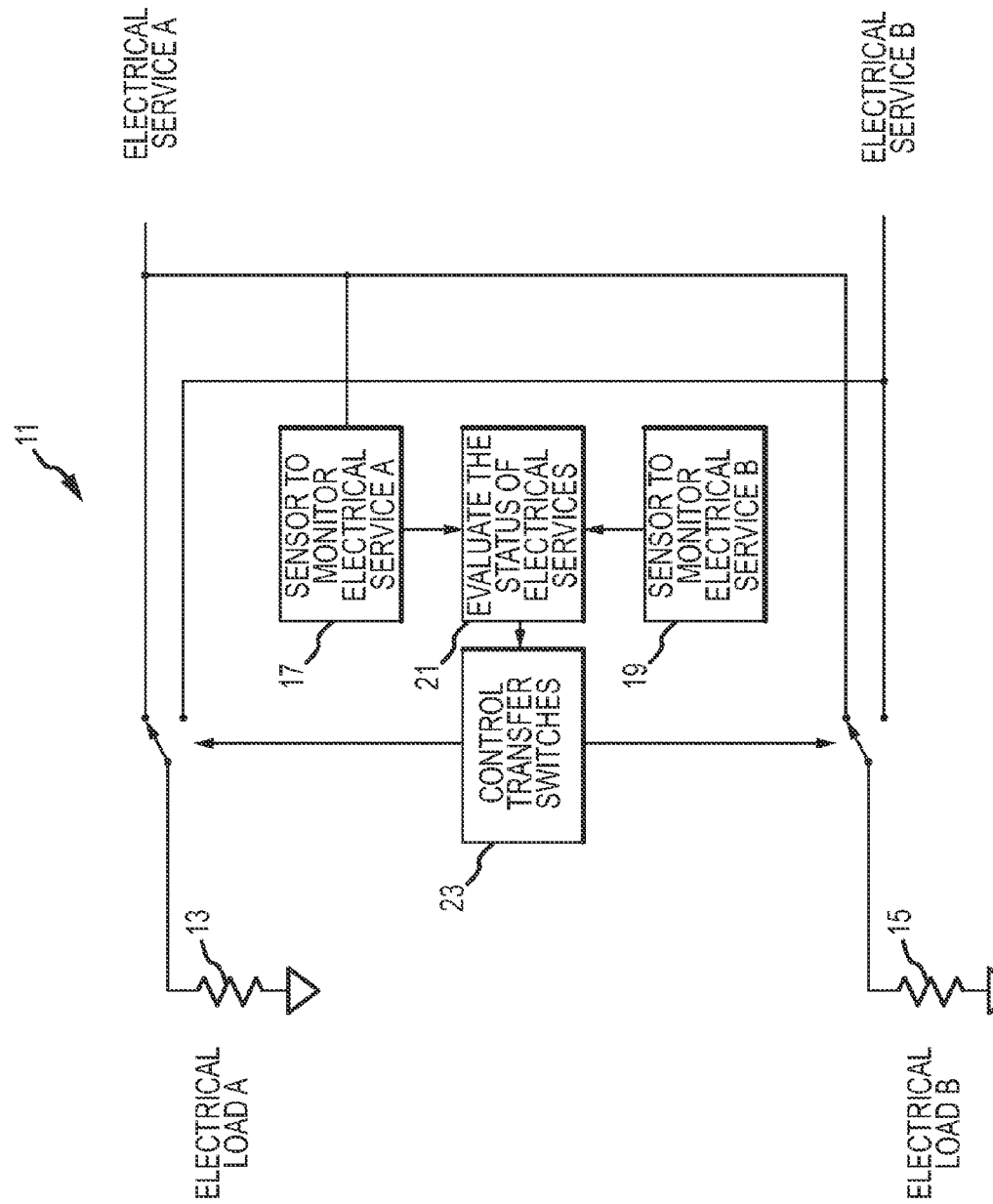
FIG. 1 is block/schematic diagram of a conventional power transfer switch.
Figure 2:
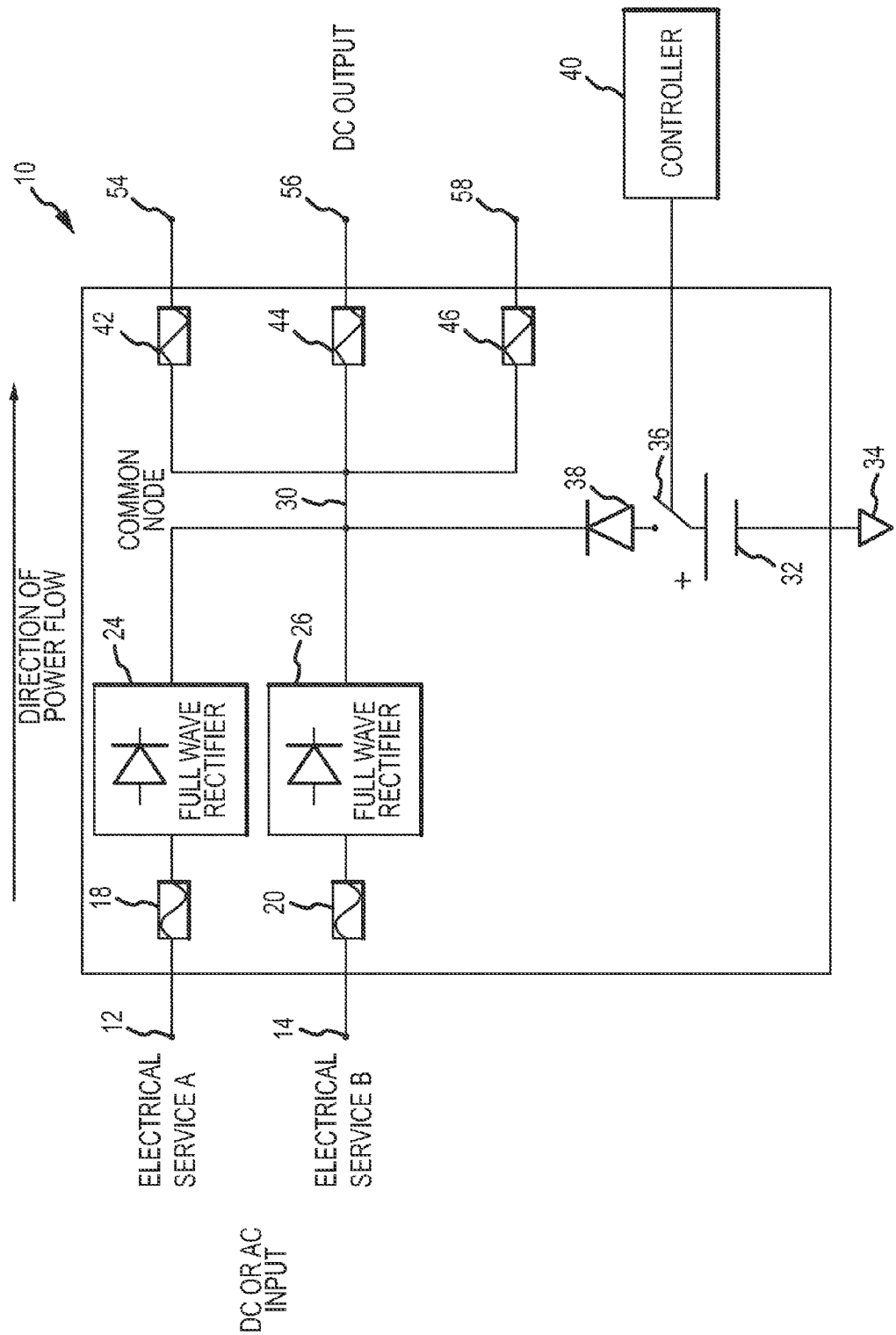
FIG. 2 is a schematic diagram of an exemplary direct current uninterruptible power supply (DC UPS) in which aspects of the present invention may be implemented.

A direct current (DC) uninterruptable power supply (UPS) device may be configured, either singly or in combination with additional devices, as an intrinsic power transfer switch. Turning to FIG. 2, an exemplary DC UPS 10 is illustrated for configuration as an intrinsic power transfer switch. It should be appreciated, however, that FIG. 2 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

DC UPS 10 includes two or more inputs 12, and 14. In the depicted embodiment, two inputs 12 and 14 are coupled to an electrical service A and B, respectively. In other embodiments, however, DC UPS 10 may be configured with three inputs corresponding to three electrical services A, B, and C, and so forth. Inputs 12 and 14 may accept alternating current (AC), direct current (DC), or partially or fully rectified AC power.

Each of the inputs 12 and 14 are coupled to circuit protection devices 18 and 20. Circuit protection devices 18 and 20 may, as one skilled in the art will anticipate, vary for a particular implementation. For example, circuit protection devices 18 and 20 may include fuses, fuse elements, fusible links, circuit breakers, and the like as the skilled artisan will expect.

Circuit protection devices 18 and 20 are each coupled to a rectifier. In the depicted embodiment, full wave rectifiers 24 and 26 are shown coupled to circuit protection devices 18 and 20. Rectifiers 24 and 26 may also include half wave rectifiers 24 and 26. The full wave rectifiers 24 and 26 are coupled to a common node 30.

A battery 32 supplies backup current in the event of a power disruption. Battery 32 is coupled between ground 34 and a disconnect switch 36. Disconnect switch 36 is in turn coupled to a blocking diode 38. Disconnect switch 36 may be actuated by a controller 40. For example, disconnect switch 36 may be a relay or a similar device. Controller 40 may provide a control signal to the disconnect switch 36 upon a detection of a power disruption from one or more of the inputs 12 and 14. As one skilled in the art will expect, disconnect switch 36 may include transistor devices, such as metal oxide semiconductor field effect transistors (MOSFETs).

Circuit protection devices 42, 44, and 46 are shown coupled to the common node 30, and correspond to one of three DC outputs 54, 56 and 58. DC outputs 54, 56, and 58 are adapted for connection to at least one electrical load. The connected load(s) are shared between the outputs 54, 56, and 58. Circuit protection devices 42, 44, and 46 may again include fuse and circuit breaker devices as previously described to isolate load faults. Disconnect switches 48, 50, and 52 may be coupled between the DC outputs 54, 56 and 58 and circuit protection devices 42, 44, and 46. Here again, disconnect switches 48, 50, and 52 may include a variety of circuit elements and may optionally be controllable similarly to disconnect switch 36.

DC UPS 10 rectifies input currents (e.g., input 12 and input 14). The outputs of each of the rectified currents are combined at common node 30. Inputs 12 and 14 are rectified, then combined at common node 30. After the inputs 12 and 14 are rectified, they may be combined independently of phase, frequency or magnitude of the individual inputs.

Figure 3:
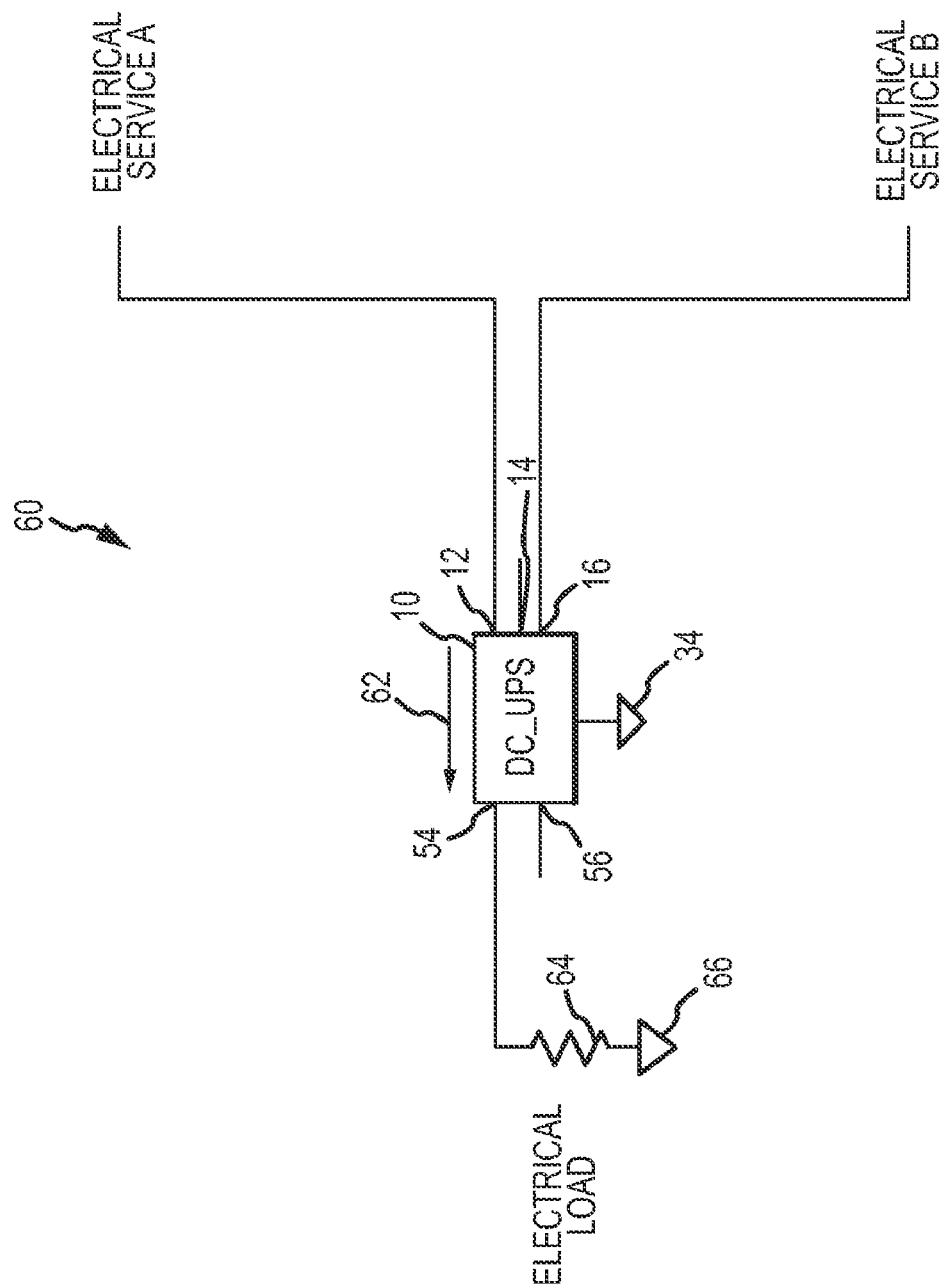
FIG. 3 is a schematic diagram of the exemplary DC UPS depicted in FIG. 2 configured as an intrinsic power transfer switch.

An exemplary configuration 60 of a DC UPS 10 as an intrinsic power transfer switch is shown in FIG. 3, following, with arrow 62 indicating the direction of current flow. Here, as in FIG. 1 previously, two electrical services (A and B) are provided. Input 12 of the DC UPS 10 is coupled to the electrical service A. In the depicted embodiment, input 14 is left unconnected. Input 16 is coupled to the electrical service B.

On the output side of DC UPS 10, output 54 is coupled through an electrical load 64 to ground 66. Output 56 is left unconnected. In the depicted embodiment, the sum of the input currents from electrical service A and B is equal to the output current measured at output 54. If either of the electrical services A and B is lost, electrical service continuing to function will continue to supply power to the electrical load 64.

Figure 4:
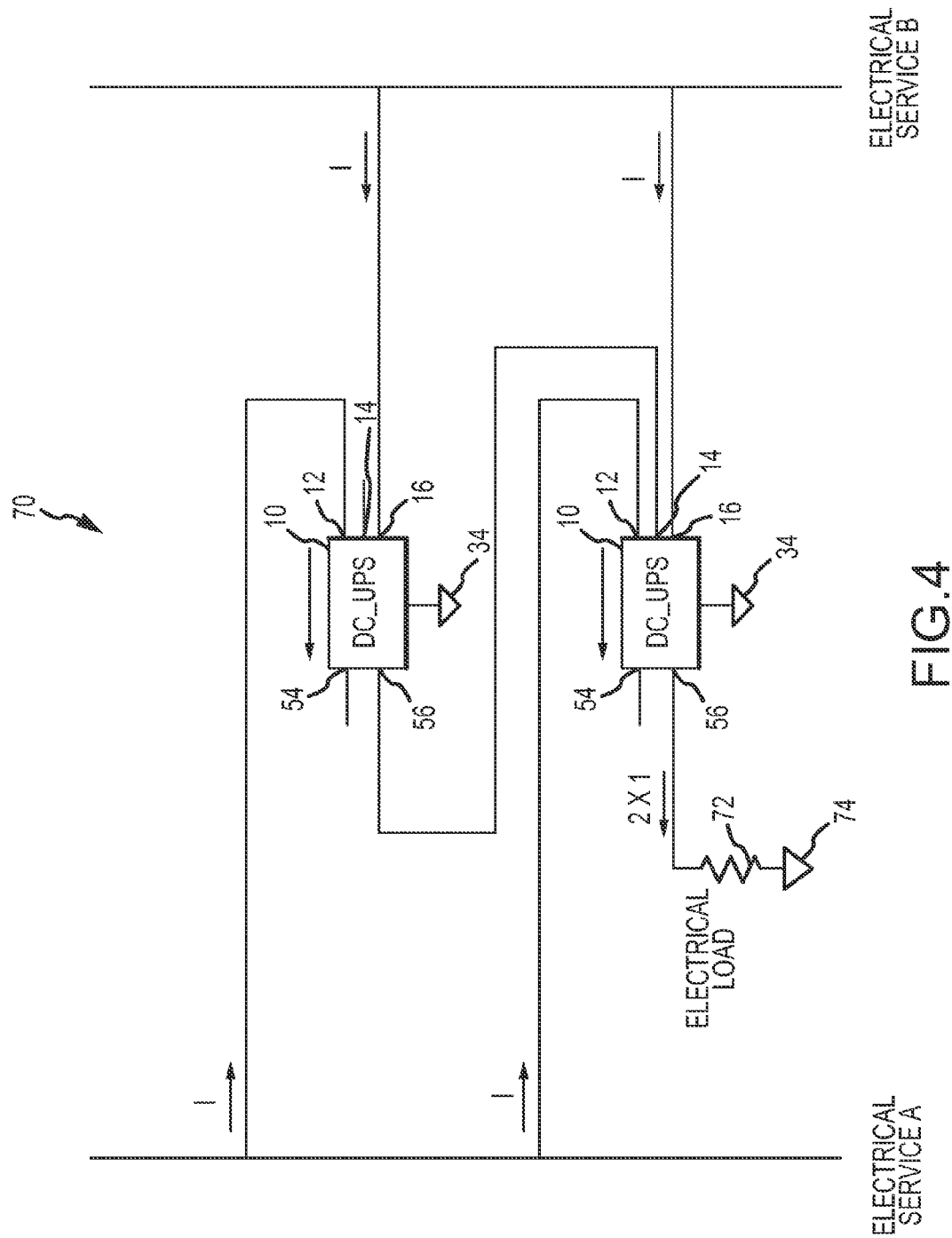
FIG. 4 is a schematic diagram of a network of two exemplary DC UPS devices collectively configured as an intrinsic power transfer switch.

A second example of an intrinsic power switch uses a network 70 of two interconnected DC UPS 10 devices as seen in FIG. 4, following, to supply a single high-power electrical load 72 that requires two electrical service inputs. The output 56 of the first DC UPS 10 directly drives the load 72, and the second DC UPS 10 drives the load 72 through the first DC UPS (output 56 of the second DC UPS is coupled to input 14 of the first DC UPS). Load 72 is coupled to ground 34. Each DC UPS 10 is coupled to both electrical services, with an input 12 coupled to electrical service A, and an input 16 coupled to electrical service B.

Here again, the sum of the input currents is equal to the output current measured at output 56. To be able to operate from a single electrical service in the event of a lost service, the sum of the currents to the load must be less than the sum of maximum available current from any two input power paths. If either of the electrical services A or B is lost, the other service will continue to supply power to the electrical load 72. In addition, the depicted configuration may handle the loss of any one input, coming from any input feed.

While one or more embodiments of the present invention have been illustrated in detail, the skilled artisan will appreciate that modifications and adaptations to those embodiments may be made without departing from the scope of the present invention as set forth in the following claims.

What is claimed is:

1. An intrinsic power transfer switch for a high-power electrical load, comprising:
   a first power supply;
   a second power supply independent of the first power supply;
   a first direct current (DC) uninterruptible power supply (UPS) including a first input coupled to the first power supply, a second input coupled to the second power supply, a third input, and a first output configured to be coupled to the electrical load and for driving the electrical load; and
   a second DC UPS including a fourth input coupled to the first power supply, a fifth input coupled to the second power supply, and a second output coupled to the third input of the first DC UPS, wherein the intrinsic power transfer switch continues to supply power to the electrical load in the event of a loss of either the first power supply or the second power supply.

2. The power transfer switch of claim 1, wherein the first DC UPS includes:
   a first rectifier coupled to the first input,
   a second rectifier coupled to the second input, and
   a first common node coupled to the first rectifier and the second rectifier; and
   wherein the second DC UPS includes:
   a third rectifier coupled to the fifth input,
   a fourth rectifier coupled to the fourth input, and
   a second common node coupled to the third rectifier and the fourth rectifier.

3. The power transfer switch of claim 2, wherein the first, second, third, and fourth rectifiers are one of full wave rectifiers and half wave rectifiers.

4. The power transfer switch of claim 2, wherein the first DC UPS further includes:
   a first battery coupled to the first common node, and a first disconnect switch coupled between the first battery and the first common node, and
   wherein the second DC UPS includes:
   a second battery coupled to the second common node, and
   a second disconnect switch coupled between the second battery and the second common node.

5. The power transfer switch of claim 4, wherein the first DC UPS further includes:
   a first blocking diode coupled between the first battery and the first common node, and
   wherein the second DC UPS includes:
   a second blocking diode coupled between the second battery and the second common node.

6. The power transfer switch of claim 4, further including:
   a first controller, wherein the first disconnect switch is adapted for connection to the first controller for actuating the first disconnect switch upon a first power loss; and
   a second controller, wherein the second disconnect switch is adapted for connection to the second controller for actuating the second disconnect switch upon a second power loss.

7. The power transfer switch of claim 2, further including a first disconnect switch coupled between the first battery and the first common node.

8. The power transfer switch of claim 7, further including a second disconnect switch coupled between the first common node and the first output.

9. The power transfer switch of claim 2, further including a disconnect switch coupled between the first common node and the first output.

10. The power transfer switch of claim 2, further including a first disconnect switch coupled between the second battery and the second common node.

11. The power transfer switch of claim 10, wherein the second DC UPS further includes a third output configured to be coupled to the electrical load and for driving the electrical load.

12. The power transfer switch of claim 11, further including a second disconnect switch coupled between the second common node and the third output.

13. The power transfer switch of claim 2, wherein the second DC UPS further includes a third output configured to be coupled to the electrical load and for driving the electrical load, and further including a disconnect switch coupled between the second common node and the third output.

14. The power transfer switch of claim 2, wherein the second DC UPS further includes a third output configured to be coupled to the electrical load and for driving the electrical load, and further including:
   a first disconnect switch coupled between the first battery and the first common node;
   a second disconnect switch coupled between the first common node and the first output;
   a third disconnect switch coupled between the second battery and the second common node; and
   a fourth disconnect switch coupled between the second common node and the third output.

15. The power transfer switch of claim 1, wherein the first and second power supplies are direct current inputs.

16. The power transfer switch of claim 1, wherein the first and second power supplies are alternating current inputs.

17. The power transfer switch of claim 1, wherein the first and second power supplies are partially rectified alternating current inputs.

* * * * *